United States Patent
Yamagami et al.

(10) Patent No.: US 6,836,830 B1
(45) Date of Patent: Dec. 28, 2004

(54) METHOD OF DATA BACKUP IN A COMPUTER SYSTEM AND A STORAGE SYSTEM THEREFOR

(75) Inventors: Kenji Yamagami, Tokyo (JP); Minoru Kosuge, Odarawa (JP); Hiroshi Arakawa, Yokohama (JP); Takashi Oeda, Sagamihara (JP); Koichi Kimura, Kamakura (JP); Haruaki Watanabe, Isehara (JP); Kenzo Tabata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 637 days.

(21) Appl. No.: 09/584,319

(22) Filed: May 31, 2000

(30) Foreign Application Priority Data

Jun. 1, 1999 (JP) .......................................... 11-153386
Apr. 10, 2000 (JP) ....................................... 2000-113220

(51) Int. Cl.[7] .............................................. G06F 12/00
(52) U.S. Cl. ............................ 711/162; 714/6; 707/204
(58) Field of Search ........................... 711/162; 714/13, 714/54, 6; 707/204, 2.4; 710/51

(56) References Cited

U.S. PATENT DOCUMENTS

| | | | | |
|---|---|---|---|---|
| 5,335,352 A | * | 8/1994 | Yanai et al. .................... 710/51 |
| 5,432,922 A | * | 7/1995 | Polyzois et al. ................ 714/6 |
| 5,504,861 A | * | 4/1996 | Crockett et al. ............... 714/13 |
| 5,592,618 A | * | 1/1997 | Micka et al. ................... 714/54 |
| 5,692,155 A | * | 11/1997 | Iskiyan et al. .............. 711/162 |
| 5,857,208 A | * | 1/1999 | Ofek ........................... 707/204 |
| 5,870,537 A | * | 2/1999 | Kern et al. ..................... 714/6 |
| 6,035,412 A | * | 3/2000 | Tamer et al. ................... 714/6 |
| 6,625,705 B2 | * | 9/2003 | Yanai et al. ................. 711/162 |

OTHER PUBLICATIONS

"Legato NetWorker for EMC Symmetrix Installation and Administration Guide", the Legato, Ltd.
"White Paper Celestra Architecture for Serverless Backups".
"Celestra Block Copy Interface Specification".
Working Draft SCSI Extended Copy Command, pp. 1–34.

* cited by examiner

Primary Examiner—Mano Padmanabhan
Assistant Examiner—Thang H Ho
(74) Attorney, Agent, or Firm—Mattingly, Stanger & Malur, P.C.

(57) ABSTRACT

In a computer system having a computer, a storage system having storage units being coupled to the computer and for storing user data used by the computer, and a backup device being coupled to the computer and the storage system, a backup method is presented for obtaining a backup of the data stored in the storage unit to the backup device. The storage system holds the user data dually in a first and a second storage units. In backing up the user data, a split instruction for releasing the duplex state of the first and the second storage units is sent from the computer to the storage unit. In response to the split instruction, the storage system interrupts the reflection of the update of the user data to the first storage unit onto the second storage unit. Then, a copy instruction for copying the user data held in the second storage unit to the backup device is sent from the computer to the storage system. The storage system operates to transfer the user data inside of the second storage unit to the backup device in response to the copy instruction.

3 Claims, 16 Drawing Sheets

FIG.10

| | IN-USE FLAG | ~300 |
| | COPY SOURCE VOLUME NUMBER | ~303 |

BLOCK INFORMATION

| BLOCK NUMBER (301) | COPY STATE (302) |
|---|---|
| 0 | COPY UNNECESSARY |
| 1 | COPY NECESSARY & UNSAVED |
| 2 | COPY NECESSARY & SAVED |
| 3 | COPIED |
| 4 | COPIED |
| ⋮ | ⋮ |

VOLUME MANAGEMENT INFORMATION

| VOLUME NUMBER (400) | COPY STATE FLAG (401) |
|---|---|
| 0 | UNDER COPYING |
| 1 | ORDINARY |
| ⋮ | ⋮ |

METHOD OF DATA BACKUP IN A COMPUTER SYSTEM AND A STORAGE SYSTEM THEREFOR

BACKGROUND OF THE INVENTION

The present invention relates to a method of backing up data stored in a storage unit provided in a computer system. More particularly, the present invention relates to a method of backing up data from a disk system into a storage medium for a backup without having to interrupt I/O processing of an application program running on a computer.

A typical computer system needs to back up data stored in a storage medium such as a disk system for protecting the data from being broken by some unfavorable factors such as system failure, human inadvertent mistake, and disasters. In general, an ordinary user backs up the data at night once a day or a week by interrupting an online service. In recent days, however, a request for an uninterruptible online service is rising for the purpose of globalizing an enterprise or enhancing a customer's satisfaction level. For this purpose, a time to be spared for a data backup is made shorter and shorter.

As a technology for coping with such a request, there is known a technology disclosed in the white paper "Legato NetWorker for EMC Symmetric Installation and Administration Guide" of the Legato, Ltd. disclosed in a website "www.legato.com" on the Internet. The technology disclosed therein is arranged to provide a pair of disk drives in a disk system. In the ordinary online service, the data is duplicated and stored in these two disk drives. When the data stored in one disk drive (corresponding to a user volume) is updated by the online service, the updated content is reflected on the other disk drive (corresponding to a secondary volume). In backing up the data, in response to an instruction given from a host computer, the system is operated to write the data that is not reflected on the disk drive and held in a cache memory (the data is called dirty data), onto a disk drive, split a pair of disk drives into each one, and avoid reflection of the updated data in the user volume onto the secondary volume. Then, the host computer for performing the online service operates to continue the processing with the user volume. The secondary volume stores the data at the time of splitting the pair of disk drives. This data is copied onto a backup storage unit such as a magnetic tape device by means of another computer, for the purpose of backing up the data. Upon completion of the backup processing, the host computer operates to issue a re-synchronizing command so that it may return the user volume and the secondary volume to the duplex state.

This backup method makes it possible to obtain a consistent backup of the data because all the data is frozen at a time when all the dirty data has been reflected onto the primary volume. Further, the split of the pair state is completed for quite a short time, so that no interruption of the online processing is required. The data (frozen data) held in the secondary volume at the time of the pair split is called snapshot.

As another method of obtaining the snapshot, there are known a technology disclosed in the white paper "Celestra Architecture for Serverless Backups" and "Celestra Block Copy Interface Specification" of the Legato, Ltd. disclosed in the website "www.iguard.com" on the Internet. The technologies disclosed therein utilize a command for copying data from one volume to another volume or from a volume to a data device. This command is called a CCOPY command. In advance of obtaining a backup, the host computer operates to flush the dirty data and then write the data into a user volume. Then, the host computer uses the CCOPY command to copy the data from the user volume into the work volume. When the application program running on the host computer operates to write the data onto an area where no data is copied of the working volume, the copy program operates to detect it and keep the writing process waiting until the copy of the area is completed. The foregoing processing makes it possible to obtain the data at the time of starting the process of obtaining a backup process, on the working volume. After that, the host computer operates to use the CCOPY command for backing up the data from the working volume into the tape device.

SUMMARY OF THE INVENTION

In order to prevent the application program from being hung up as a result of a timeout or reduce the waiting time of the online processing, it is necessary to make the waiting time of the application program minimum. Through the use of a method of obtaining the snapshot according to the foregoing prior art, when the application program tries to update the data on the area that is not copied into the working volume, the writing processing is kept waiting until the copy on the area is completed. In copying all the data of the user volume onto the working volume at a batch, the processing of the application program is kept waiting until copying of all the data is completed. In order to avoid such a shortcoming, it is considered that the target data is copied into the working volume bit by bit. However, in the case of copying the data bit by bit, one CCOPY command is used for partially copying the area to be backed up. It means that the number of the issuing times of the copy command is increased. Further, the foregoing prior art is arranged to temporarily copy the data of the user volume into the working volume and then save the data into the storage medium for a backup such as a magnetic tape. Hence, the time up to the completion of the backup processing is made longer.

It is an object of the present invention to overcome those shortcomings of the prior arts involved and to provide a method of backing up the data which is arranged to reduce the waiting time of the writing process of the application program as reducing the times of copies.

In achieving the object, according to an aspect of the invention, a user data used by a computer in a storage unit system is held dually in first and the second storage units. The storage system operates to update the user data of the first storage unit and to reflect the updated content onto the second storage unit in response to a request for updating the user data given from the computer. In backing up the data, a splitting instruction for releasing the duplex state of the first and the second storage units is given from the computer into the storage system. In response to the splitting instruction, the storage system operates to interrupt reflection of the updated user data in the first storage unit onto the second storage unit. Then, a copy instruction for copying the user data held in the second storage unit into the backup storage device is sent from the computer into the storage system. In response to a copy instruction, the storage system operates to transfer the user data held in the second storage unit into the backup storage device.

According to another aspect of the invention, in backing up the data, a copy request for a specified area to be copied is issued from the computer into the storage system. In response to the copy request, the storage system operates to release the duplex state of the first and the second storage units and start copying of the user data from the second storage unit into the backup storage device. Preferably, when the duplex state is released, a report on completion is given back from the storage system into the computer. The computer operates to restart the update processing of the user data in response to this report.

According to another aspect of the invention, the storage system provides the user volume for storing the user data to be used by the computer as well as a working volume for saving the data in copying the data of the user volume into the backup storage device and backing up the data. In response to the copy request for the data to be copied from the user volume into the backup storage device, the storage system operates to read the user data held in the area specified by the copy request out of the user volume and then to start the copy process to the backup storage device. During the copying of the user data onto the backup storage device, when a request is given for writing the data onto the user data in the area specified by the copy request, the user data held in the area where the data is written is transferred onto the working volume according to the writing request. After the user data is saved in the working volume, the data writing is done upon the writing request. The storage system operates to determine if the user data to be copied into the backup storage device is held in an area inside of the user volume or an area inside of the working volume, read the user data based on the determined result, and transfer the user data into the backup storage device.

A further understanding of the nature and advantages of the invention herein may be realized by reference to the remaining portions of the specification and the accompanying drawings.

BRIEF DESCRIPTION OF THE DRAWINGS

FIG. 10 is a conceptual illustration showing a data structure of copying state management information in the fifth embodiment;

FIG. 11 is a conceptual illustration showing a data structure of volume management information in the fifth embodiment;

DESCRIPTION OF THE EMBODIMENTS

Figure 1:
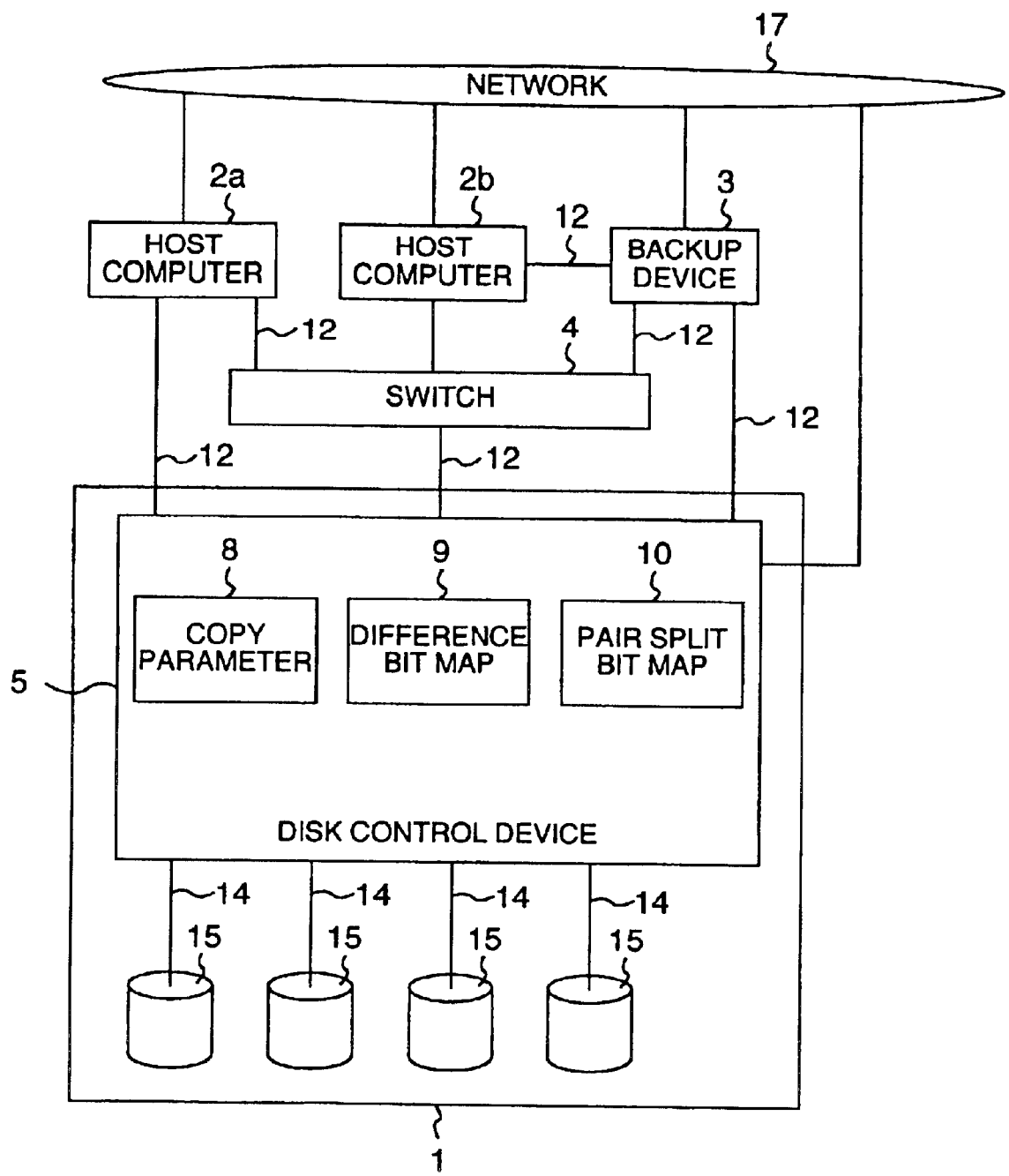
FIG. 1 is a simplified block diagram showing an arrangement of a computer system to which the invention applies.

FIG. 1 is a simplified block diagram showing an arrangement of a computer system to which the present invention applies. The computer system includes a host computer 2 (2a and 2b), a disk system 1, and a backup storage device 3. The host computer 2, the backup storage device 3, and the disk system 1 are connected in a network 17 so that they may communicate with one another through the network 17. The network 17 may be a general LAN such as 10BaseT or 100BaseT. The communications through the network 17 are executed along the network protocol such as TCP/IP or UDP.

The disk system 1 is connected to the host computer 2 and the backup storage device 3 through a switch 4. The disk system 1 is directly connected to the host computer 2a and the backup storage device 3 through a channel bus 12. The channel bus 12 may be a SCSI cable or a Fibre channel. Herein, the fiber channel may be used as the channel bus 12. In the case of applying the fiber channel as the channel bus 12, a point-to-point connection such as a connection between the host computer 2a and the disk system 1 may be executed between two devices. Alternatively, a connection through the switch 4 may be executed therebetween. In addition, a loop-like connection, called FC-AL, may be executed between some devices (called nodes).

On the host computer 2, some programs are run such as an application program for doing a service like an online process and another program for controlling a pair state of volumes serving as logical storage units formed in the disk system 1, executing the backup and the restore, and managing the backup storage device 3 as a function of realizing the backup in this embodiment.

The backup storage device 3 is a device for storing the backup of the data stored in the disk system 1. The backup storage device 3 may be a magnetic tape library device, a cartridge tape device, a DVD (library) device, a DVD-RAID device, a CD-RW, a disk device, or the like.

The disk system 1 includes one or more disk devices 15 for storing the data and a disk control device 5 for controlling data transfer between the disk device 15 and the host computer 2. A channel path 14 is connected between the disk device 15 and the disk control device 5. Herein, a SCSI cable is used for the channel path 14 and the used disk device 15 adapts to the SCSI interface.

In this and the following embodiments, the disk control device 5 operates to form a volume serving as a logical disk device of the disk device 15. The host computer 2 recognizes the volume serving as a logical disk device as a disk device and then makes access to the data held therein. One disk device 15 may be used as one volume or two or more volumes. In recent days, the technology called RAID is generally used. The technology is arranged to recognize two or more disk devices 15 as one group, form a volume on this group, and distributively locate the data on the volume formed on two or more disk devices. This embodiment may apply to the use of the RAID for the disk system 1.

The disk control device 5 includes a processor, a memory and so forth (not shown) for controlling data transfer between the disk device 15 and the host computer 2. It realizes various functions through the program control. The disk control device 5 holds in the memory at least one of a copy parameter 8, a difference bit map 9, and a pair split bit map 10 as control information. The control information is selectively used according to the format of the backup to be described below. In the first embodiment being described herein, of the control information, the copy parameter 8 and the difference bit map 9 are used.

The copy parameter 8 is received from the host computer 2. The difference bit map 9 is provided in correspondence to the volume. As will be discussed below, if the host computer 2 operates to update the volume after the user volume is separated from the secondary volume, the corresponding bit of the difference bit map 9 is held on. The difference bit map 9 holds a bit at each block inside of the volume so that each bit corresponds to the block number in sequence, and concretely, the bit 1 corresponds to a block number 1, the bit 2 corresponds to a block number 2, and so forth. Of course, the bit of the difference bit map 9 is not required to correspond to the block of the volume in a one-to-one manner. For example, it is possible to make one bit correspond to each unit of n blocks (n>1). This correspondence makes it possible to reduce the volume of the difference bit map.

Figure 2:
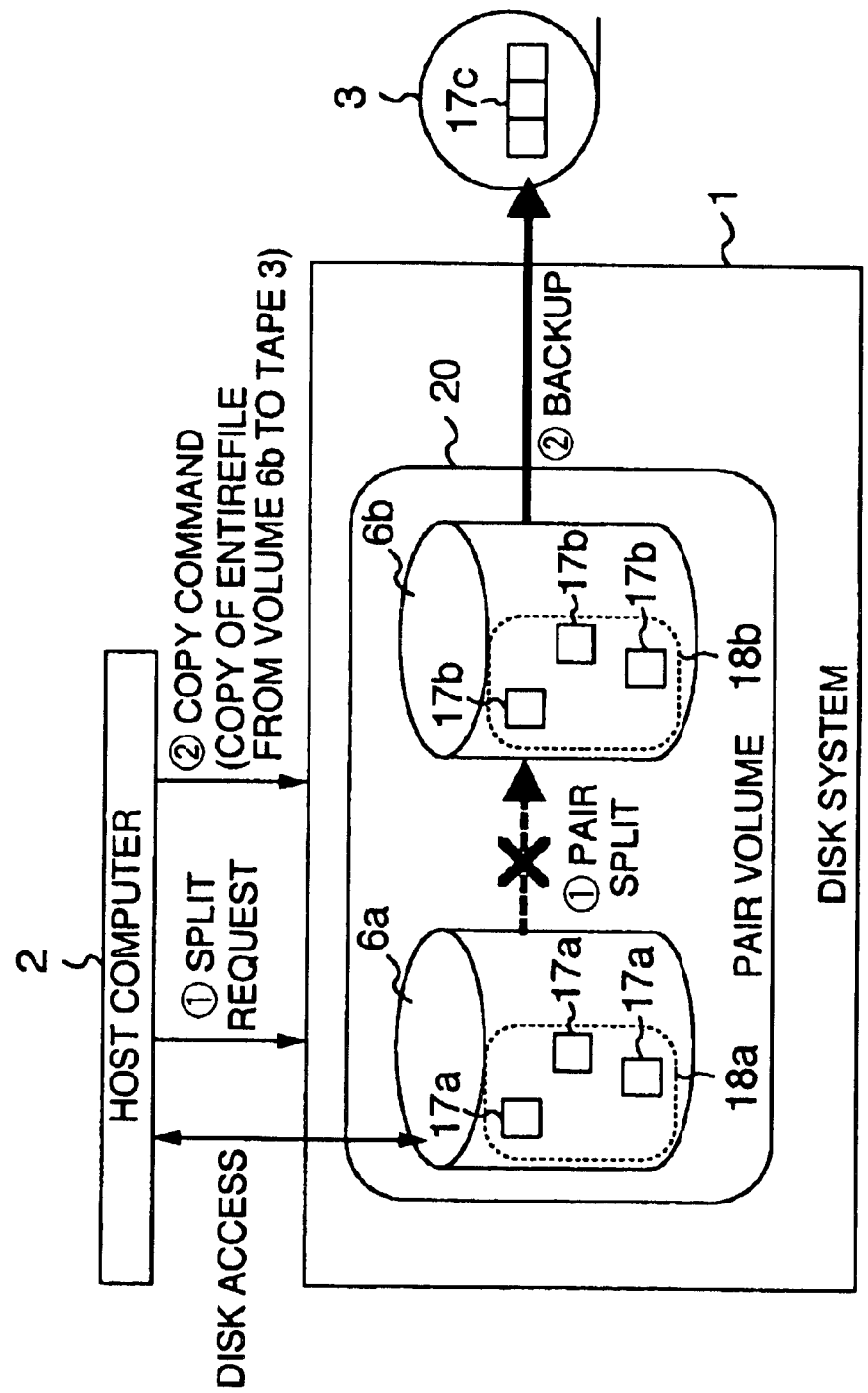
FIG. 2 is a conceptual diagram showing a general concept of backup processes according the first to the fourth embodiments of the invention.

FIG. 2 is a conceptual diagram showing a concept of a backup process in this embodiment.

The disk system 1 provides the user volume 6a and the secondary volume 6b, which are paired with each other and serve to dually hold the user data used by the host computer 2. The pair of the user volume 6a and the secondary volume 6b is called a pair volume 20.

When the host computer 2 operates to update the data of the user volume 6a in the state that the pair volume 20 is formed, the content of the update is reflected on the secondary volume 6b. This makes it possible to keep the duplex state of the pair volume 20. The volume 6 has two or more blocks of a fixed length. Each block 17 is uniquely numbered in each volume 6. The volume 6 stores one or more files 18. The file 18 is made up of data stored in one or more blocks 17. The file 18 is a logical access unit recognized by the program running on the host computer 2. It is not required that the serial blocks on the volume 6 be allocated to the file. The backup is executed at each file 18.

In the backup process, at first, the host computer 2 issues a pair split command to the disk system 1. In receipt of the pair split command, the disk system 1 operates to release the duplex state. That is, the disk system 1 does not operate to reflect the update onto the secondary volume 6b against the request for updating the user volume received from the host computer 2 after the disk system 1 has received the pair split command. This makes it possible to freeze the data on the secondary volume 6b to the content at a time when the pair split command is received. Then, the host computer 2 operates to issue a copy command from the secondary volume 6b to the backup storage device 3 for backing up the data. As a parameter of the copy command, an indication is given for copying all the blocks 17b composing the file 18b to be backed up. The disk system 1 responds to the copy command and operates to copy the block 17b indicated by the copy command into the backup storage device 3. During the copy of the data from the secondary volume 6b into the backup storage device 3, the host computer 2 may keep access to the user volume 6a. During the copy, when the user volume 6a is updated, the disk system 1 operates to record the fact that the block 17a to be updated is not still reflected on the secondary volume 6b. Upon completion of the backup, the host computer 2 operates to issue a re-synchronizing command. In response to the synchronizing command, the disk system 1 operates to return the user volume 6a and the secondary volume 6b into the duplex state. If there exist some updated data of the user volume 6a that are not still reflected on the secondary volume 6b, the unreflected data is copied onto the secondary volume 6. In actual, the function of the disk system 1 is realized by the disk control device 5.

Figure 3:
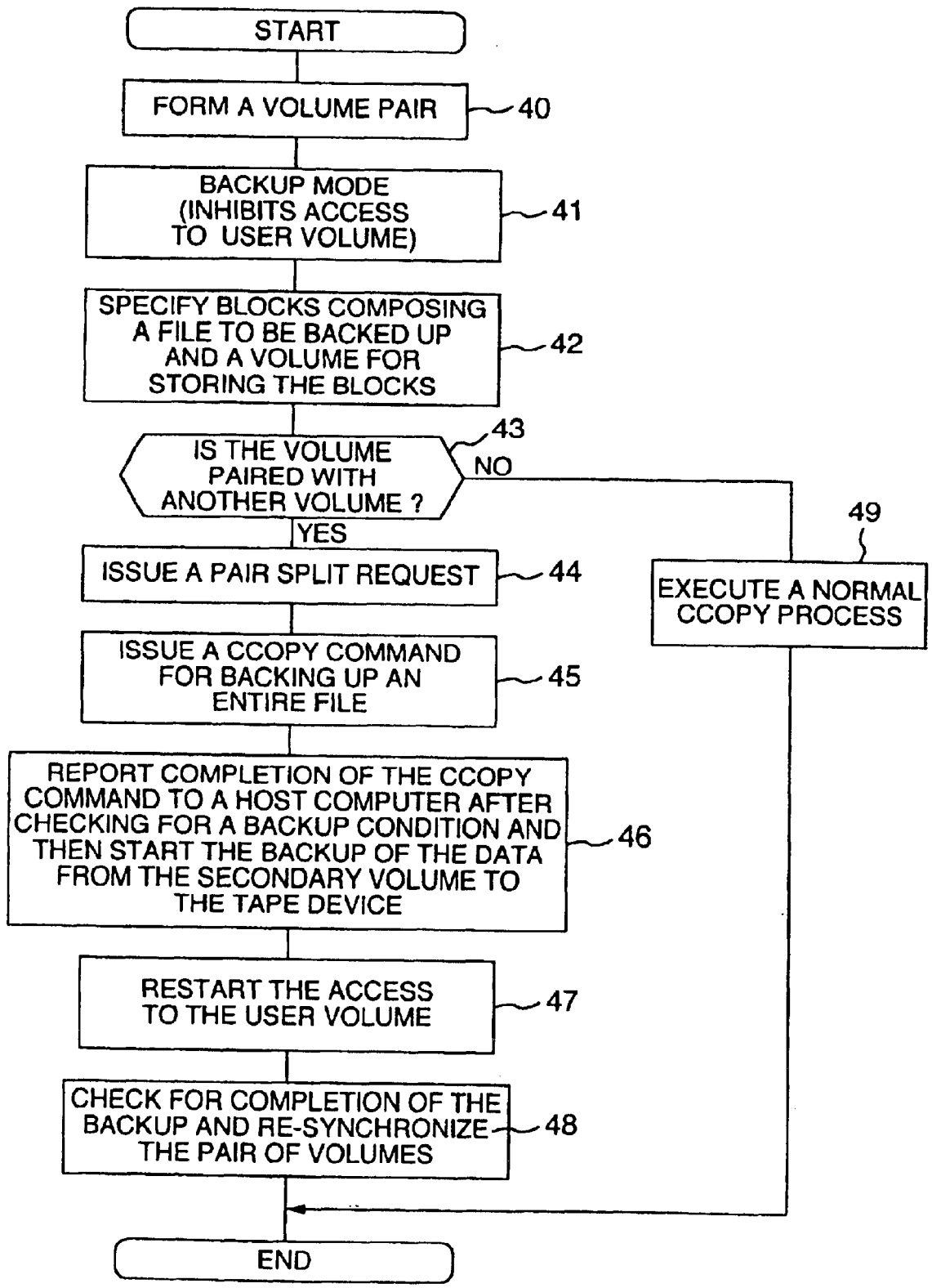
FIG. 3 is a flowchart showing a flow of a backup process according to the first embodiment.

FIG. 3 is a flowchart showing a concrete flow of the backup process.

Before the backup process, at first, the user or the administrator indicates to form the pair volume 20 through the host computer 2. The host computer 2 operates to issue a request having a parameter for specifying the user volume 6a and the secondary volume 6b to the disk system 1 according to an indication given by the user or the administrator. In receipt of this request, the disk control device 5 operates to copy the data from the user volume 6a to the secondary volume 6b and form the pair volume 20 (step 40).

When an indication given by the user or the administrator is received or at a specified time, the host computer 2 operates to start a backup program and then enters a backup processing mode. The backup program temporarily inhibits access of the application program to the user volume 6a. After that, the host computer 2 executes the backup program for performing the backup processing to be discussed below (step 41).

The host computer 2 operates to specify the user volume having the data of the file 18 to be backed up and one or more blocks inside of the user volume (step 42). The host computer 2 then operates to check if a user volume for storing a file to be backed up is paired with another volume through the use of an Inquiry command (step 43). If the user volume is paired with another volume, the host computer 2 operates to issue a pair split command for indicating the release of the duplex state to the disk system 1. In receipt of the pair split command, the disk control device 5 operates to stop reflection of the update to the user volume 6a onto the secondary volume 6b and then freeze the data of the secondary volume 6b (step 44).

Upon completion of the pair split, the host computer 2 operates to issue to the secondary volume 6b a CCOPY command for backing up the entire file 18. At a time, the secondary volume 6b to be accessed may be specified by a parameter contained in the response given back from the disk system 1 against the Inquiry command issued at the step 43. Herein, for backing up the data, the CCOPY command described with respect to the prior art is used. Alternatively, it is possible to utilize the COPY command that is standardized for the SCSI-2 (step 45).

In receipt of the CCOPY command at the step 45, the disk control device 5 operates to check if the specified volume is the secondary volume 6b corresponding to one of the pair volume 20 and if the pair is split. If the condition is not matched, the disk control device 5 operates to report an error to the host computer 2 and then cancel the backup process. If the condition is met, the disk control device 5 operates to store the specified parameter in the copy parameter 8 and report the completion of the command to the host computer 2. Then, the disk control device 5 operates to execute the backup of the data from the secondary volume 6b to the backup storage device 3 along the information stored in the copy parameter 8. The CCOPY command includes as its parameters block addresses and a block number of the source volume, that is, the secondary volume 6b and a port address of the backup storage device 3 for storing these blocks. According to these parameters, the disk control device 5 operates to read out the data from the secondary volume 6b and transmit the data to the specified port address. In addition, the report on the completion of the CCOPY command is executed at the time of starting the backup process. Hence, it does not mean the completion of the backup process itself. The disk control device 5 operates to check the executable condition of the backup and then report the completion of the command at a time when it is determined that the backup is executable (step 46).

In receipt of the report on the completion of the CCOPY command from the disk control device 5, the host computer 2 enables the application program to restart the access to the user volume 6a (step 47). Then, the host computer 2 operates to check if the backup process is completed. If it is completed, the host computer 2 operates to issue a pair re-synchronizing command and then return the pair volume 20 into the dual state. When the re-synchronizing command is received, the disk control device 5 operates to copy the difference data from the user volume 6a into the secondary volume 6b according to the difference bit map 9 (step 48).

If it is determined that the user volume is not paired with another volume at the step 43, the host computer 2 performs the conventional copy process (step 49).

In this embodiment, at a step 47, the disk control device 5 operates to check if the CCOPY command is executable. If the host computer 2 issues the CCOPY command without splitting the pair volume 20 and backs up the data without doing the check at the step 47, the frozen data cannot be backed up. That is, no data backup is made possible even in the consistent state. Hence, this process is an important step in combining the functions of splitting and synthesizing the pair with the backup process through the use of the CCOPY command.

In the foregoing embodiment, the data of the secondary volume may be frozen by splitting the pair. Further, the host computer may issue the CCOPY command for backing up the entire file to the secondary volume. Only one issuance of the CCOPY command is required, which makes great contribution to reducing the load burdened on the host in issuing the CCOPY command. Further, the backup from the secondary volume 6b to the backup storage device 3 makes it possible to do the backup process without copying the data onto the working disk, thereby reducing the backup time.

In the foregoing first embodiment, the host computer operates to indicate the re-synchronization of the pair after the completion of the backup process following the pair split and the backup indication. Further, the completion of the backup process is checked by frequent issuances of the Inquiry command. The present embodiment is arranged to eliminate these processes, thereby further reducing the issuances of the commands by the host computer. The computer system of this embodiment is analogous to that of the computer system shown in FIG. 1.

Figure 4:
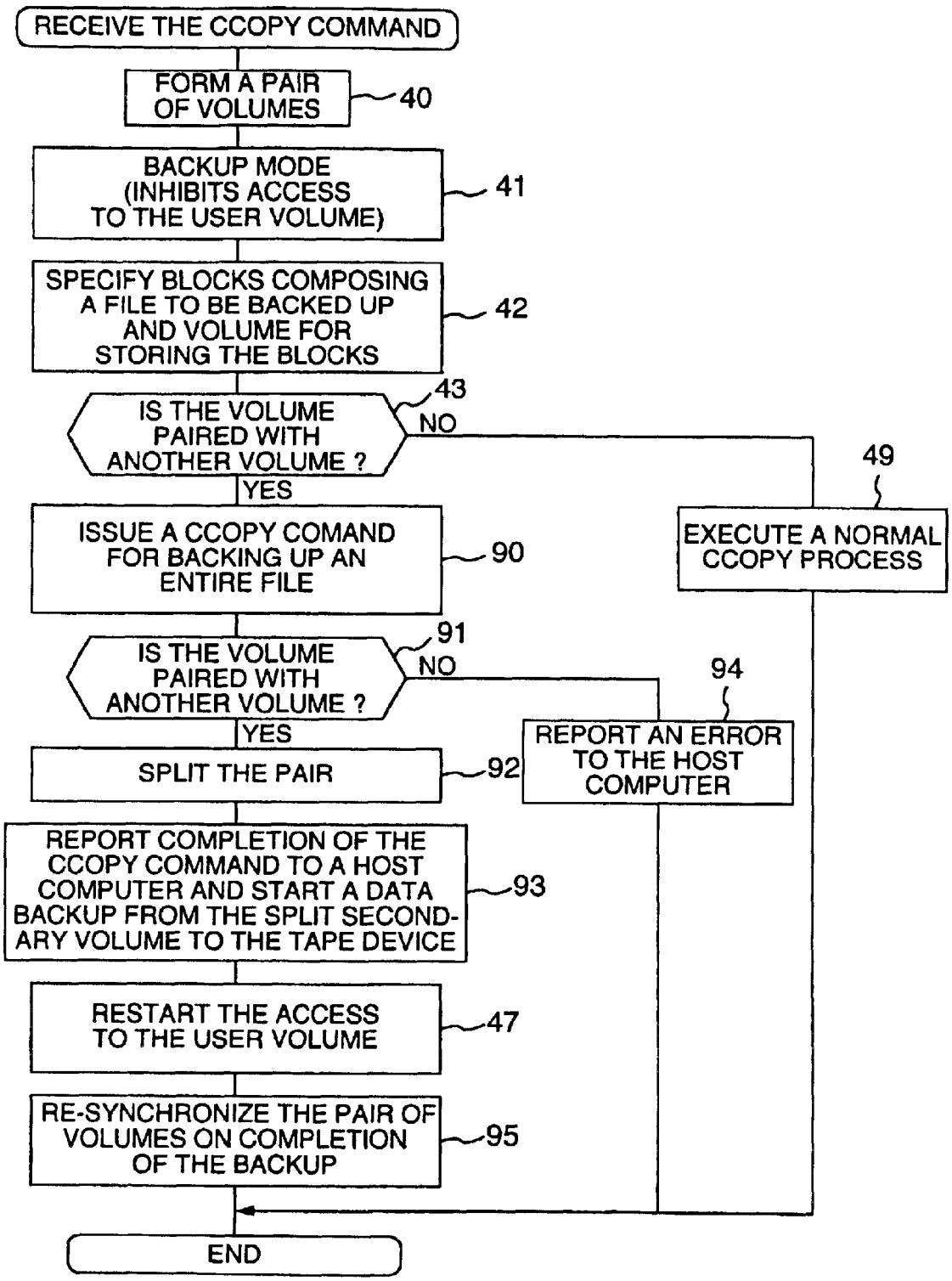
FIG. 4 is a flowchart showing a flow of a backup process according to the second embodiment.

FIG. 4 is a flowchart showing a backup process to be executed in this embodiment. In FIG. 4, the process at the steps except the steps 90 to 95 is analogous to the process at the corresponding steps in FIG. 3. Hereafter, therefore, the description thereabout will be left out.

At a step 43, when it is checked that the user volume to be backed up is paired with another one, the host computer 2 operates to issue the CCOPY command for backing the entire file at an AUTO mode. Herein, the AUTO mode means that at this mode the disk system 1 automatically executes a series of processes from the pair split, the backup from the secondary volume 6b to the backup storage device 3, and the re-synchronization of the pair. For specifying this mode, only one bit for this specification may be set to the reserved area of the CDM (Command Description Block) of the CCOPY command (step 90).

In receipt of the CCOPY command with the AUTO mode specified, the disk control device 5 operates to check if the user volume to be backed up is paired with another volume, that is, it has a secondary volume (step 91). If the user volume is not paired with another volume, the disk control device 5 operates to report an error to the host computer 2 and terminate the process (step 94). If the user volume is paired with another one, the disk control device 5 operates to split the pair, report the completion of the CCOPY command to the host computer 2, and execute the backup process from the secondary volume to the backup storage device 3 (step 93.)

With the CCOPY completion report preformed at step 93 as a turning point, the host computer 2 re-starts the volume access of the application program at step 47. In the meantime, the disk control device 5 contains the backup process. When all the backup process specified by the CCOPY command has been completed, the disk control device 5 re-synchronizes the pair and terminates the process (step 95).

With the issuance of the CCOPY command as a turning point, in this embodiment, the disk control device operates to execute a series of processes of the pair split, the backup and the pair re-synchronization. These processes are all transparent to the host computer. Hence, the host computer is not required to monitor and control the pair state. This makes it possible to simplify the backup program running on the host computer. Further, the host computer is merely required to issue the CCOPY command to the disk control device only once, which makes great contribution to reducing the issuing times of the command for the backup.

In the first and the second embodiments, the pair split and synthesis are executed at a volume unit. In actual, however, only a small area of the volume is often backed up. The split of the overall volume results in requiring the copy of the difference data about all the area inside of the re-synchronized volume. It needs a lot of time to do the re-synchronizing process. Hereafter, the description will be oriented to the third embodiment in which the backup process for considering this kind of problem is executed. In this embodiment, at the backup process, only the area to be backed up is split.

The computer system of this embodiment has the same arrangement as that shown in FIG. 1. In this embodiment, for splitting the pair volume at an area unit, a copy parameter 8, a difference bit map 9, and a pair split bit map 10 are used as the control information. The pair split bit map 10 is a bit map corresponding to the block in the corresponding volume and includes the corresponding bit to the block indicated by the split command set thereto. If the host computer 2 issues a write request to the disk control device 5, the disk control device 5 operates to refer to the pair split bit map 10 and if the corresponding bit to the block to be written is set, reflect the updated data onto the secondary volume 6b. In addition, the pair split bit map 10 may be arranged to allocate one bit to consecutive n blocks.

In this embodiment, basically, the backup process is analogous to the process of the first embodiment shown in FIG. 3. The processes to be executed at some steps are somewhat different from those of the first embodiment. Hereafter, the description will be oriented to the different processes from those of the first embodiment with reference to FIG. 3.

Figure 5:
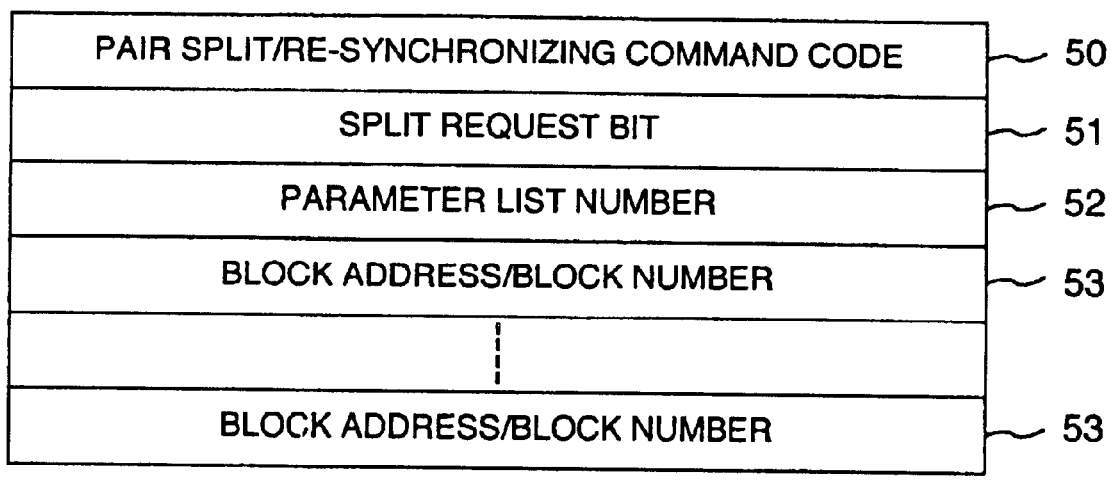
FIG. 5 is a format diagram showing a command for splitting a pair and re-synchronizing the pair.

At the step 44, in issuing the pair split request, the host computer 2 operates to specify the range containing the block to be backed up which has been specified at the step 42 and issue the pair split command. FIG. 5 shows a format of a pair split command to be issued at this time. The pair split command includes a command code 50, a split request bit 51, a parameter list number 52, and one or more parameters 53. The command code 50 is set to specify the pair split. This command is also used when the pair volume is re-synchronized and it utilizes the same command code as the pair split. The split request bit 51 is a bit for distinguishing if the command indicates the split of the pair volume or re-synchronization of the pair volume. If the pair split bit is "1", it indicates the pair split, while if it is "0", it indicates re-synchronization. Herein, the command containing the pair split bit of "1" is called a pair split command, while the command containing the pair split bit of "0" is called a pair re-synchronizing command, for the purpose of distinguishing these commands from each other. The parameter list number 52 indicates the number of the following parameter portion 53. The parameter portion 53 includes a block address of a head block of the consecutive areas to be split (or re-synchronized) and a block number of those areas. If the block to be split exists over the non-consecutive areas, the parameter 5 is created at each of the consecutive areas.

Figure 6:
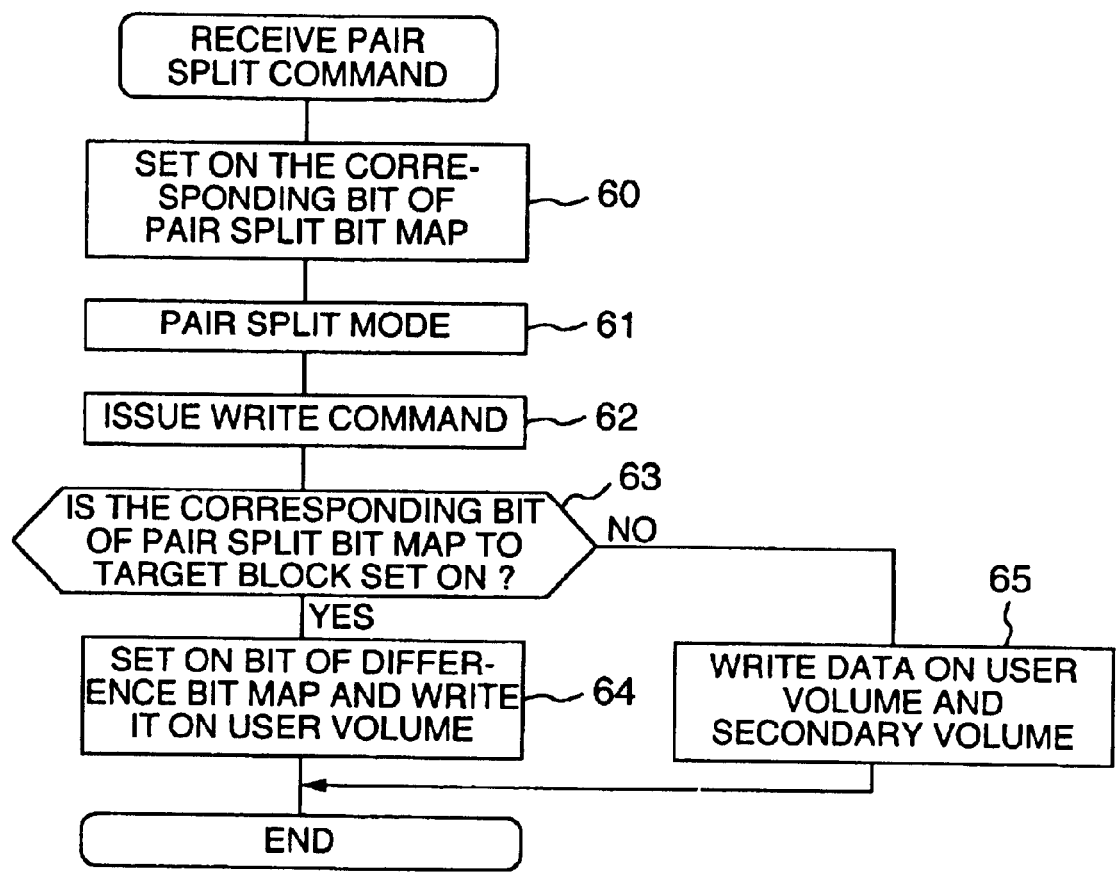
FIG. 6 is a flowchart showing a writing process at a pair split mode to be executed by a disk control device.

FIG. 6 is a flowchart showing a process executed by the disk control device 5 after the pair split command is received.

In receipt of the pair split command from the host computer 2, the disk control device 5 operates to obtain the block address of the block to be split from the block address and the block number set to the parameter portion 53. Then, based on the obtained block address, the corresponding bit to the pair split bit map 10 is set on (step 60). After this process, this volume is entered into the pair split mode (step 61).

In receipt of the write request for the volume at the pair split mode from the host computer 2 (step 62), the disk control device 5 operates to refer to the pair split bit map 10 for checking if the block specified by the write request is split. The write request includes as parameters an address of a head block where the data is to be written and the block itself where the data is to be written. The disk control device 5 operates to obtain the target block where the data is to be written on the basis of these parameters and check if the corresponding bit of the pair split bit map 10 to the target block is set on (step 63). If the target block where the data is to be written in response to the write request is contained in the area to be split, the disk control device 5 operates to set on the target bit of the difference bit map 9 and then write the data in the user volume 6a (step 64). On the other hand, if the target block where the data is to be written is located out of the area to be split, the data is written on both the user volume 6a and the secondary volume 6b (step 65).

Turning back to FIG. 3, like the first embodiment, at the steps 45 and 46, the target file is backed up from the secondary volume 6b to the backup storage device 3. Upon completion of the backup, at the step 47, the pair volume is re-synchronized. In the re-synchronization, in FIG. 5, the host computer 2 operates to issue the pair re-synchronizing command with the split request bit 51 as "0".

Figure 7:
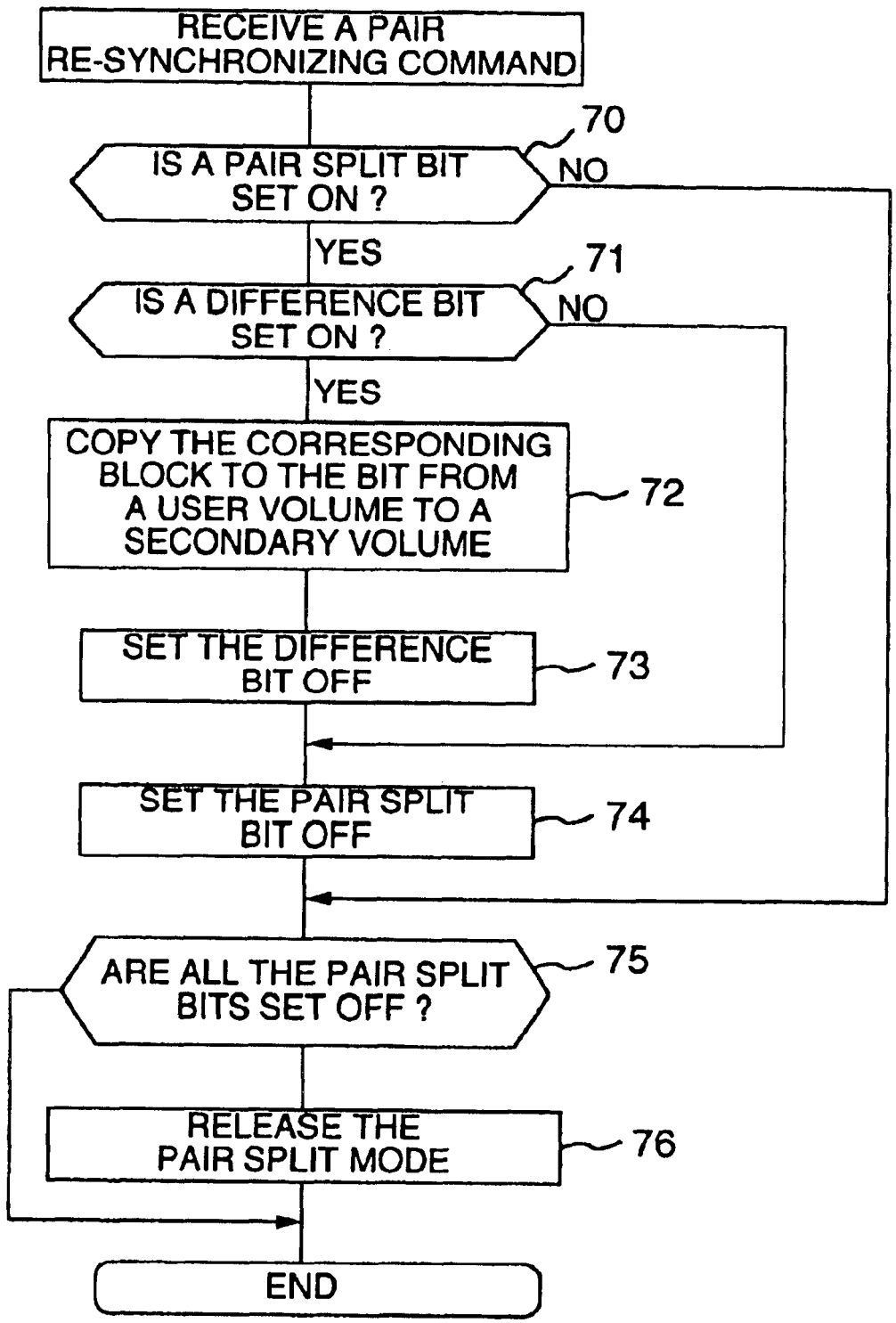
FIG. 7 is a flowchart showing a process for re-synchronizing the pair to be executed by the disk control device.

FIG. 7 is a flowchart showing a process of re-synchronizing the pair to be executed by the disk control device 5 when the pair re-synchronizing command is received.

In receipt of the pair re-synchronizing command, the disk control device 5 operates to perform the following processes with respect to all the blocks specified by the pair re-synchronizing command. The disk control device 5 operates to check if the corresponding bit of the pair split bit map 10 to the block specified by the pair re-synchronizing command is set on (step 70). If the bit of the pair split bit map 10 is set on, it is checked if the corresponding bit of the difference bit map 9 is set on (step 71). If the bit of the difference bit map 9 is set on, it means that a difference data exists. In this case, hence, the disk control device 5 operates to copy the data of the target block from the user volume 6a to the secondary volume 6b (step 72). Then, the disk control device 5 operates to set the difference bit and the pair split bit off (steps 73 and 74). In succession, the disk control device 5 operates to check the pair split bit map 10 (step 75). If all the pair split bits of the map 10 are set off, the pair split mode of this volume is released. This enables the disk control device 5 to write all the write data from the host computer 2 to write on both the user volume 6a and the secondary volume 6b (step 76). If, at the step 70, the pair split bit is not set on, the processes at the steps 71 to 74 are skipped. Further, if, at the step 71, the difference bit is set off, likewise, the processes at the steps 72 and 73 are skipped.

In this embodiment, during the pair split, only the target block to be split is separately managed. It makes it possible to reduce the time taken in re-synchronization. Further, since the area is specified when the pair is split, about the area outside of the specified one, the duplicating of the volume into the user volume and the secondary volume is made possible. Hence, when the pair is split about a certain area and then the same is done about another area, the data may be frozen at the corresponding time points to these areas. This makes it possible to back up any file stored in the same user volume at any time point.

In this embodiment, like the second embodiment, a series of processes are executed through the use of one CCOPY command and the issuing times of the command by the host computer 2 may be reduced.

Figure 8:
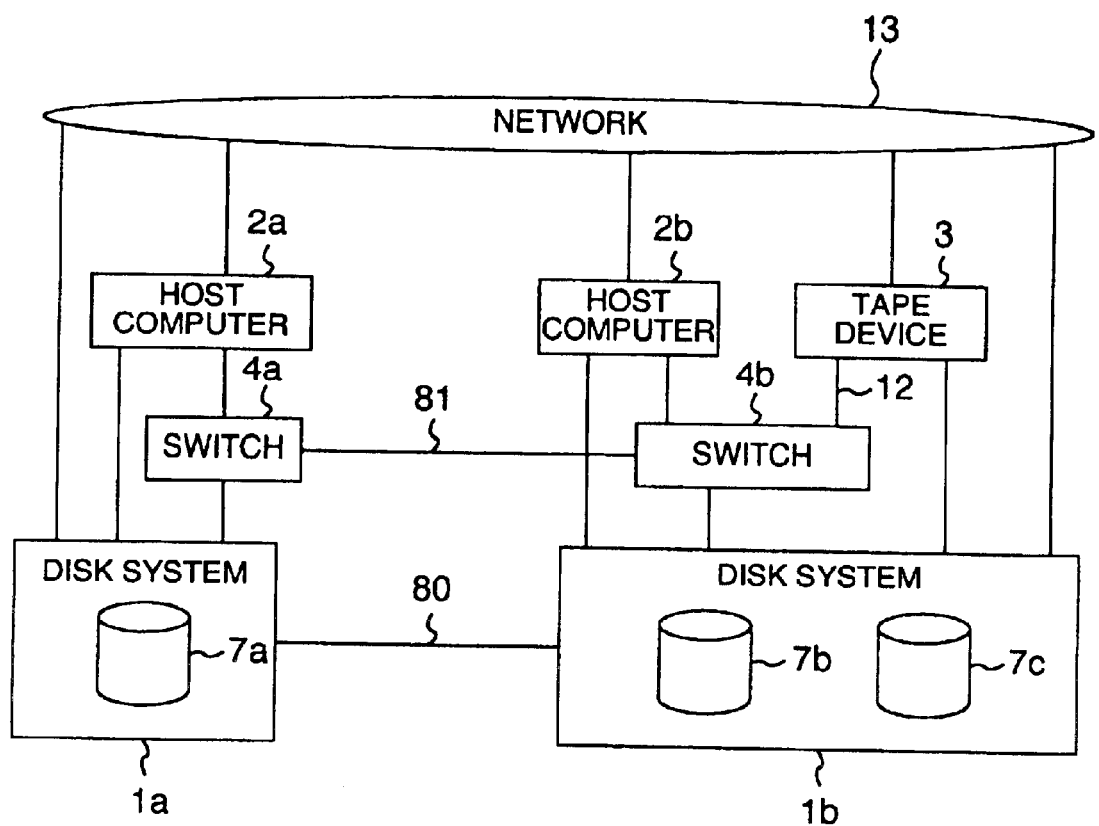
FIG. 8 is a simplified block diagram showing an arrangement of a computer system according to the fourth embodiment.

FIG. 8 is a simplified block diagram showing an arrangement of a computer system according to the fourth embodiment.

The computer system of this embodiment is arranged to have a host computer 2a, a disk system 1a, a first computer system having a switch 4a, a host computer 2b, a tape device 3, a disk system 1b, and a second computer system having a switch 4b. The first and the second computer systems are connected through a network 13. The disk systems 1a and 1b and the switches 4a and 4b are respectively connected with each other through channel paths 80 and 81 so that the data may be transferred therebetween.

The disk system 1a includes a user volume 7a. The host computer 2a executes the application program for the online process using the user data stored in the user volume 7a.

The disk system 1b includes a secondary volume 7b, which is paired with the user volume 7a. In this embodiment, when the host computer 2a operates to update the data stored in the user volume 7a, the data is transferred from the disk systems 1a to 1b through the channel path 80 or a path of the switch 4a, the channel path 81 and the switch 4b so that the updated content is reflected on the secondary volume 7b.

Also in this arrangement, the same backup process as that of the first to the third embodiments described above is executed for backing up the file to be stored in the user volume 7a.

In this embodiment, a volume 7c is included in the disk system 1b and the volumes 7b and 7c may be dualized. In this case, the volumes 7a, 7b and 7c are put in the triplex state where the same data is held in these volumes. When backing up the user volume 7a, the host computer 2b operates to split the pair of the volumes 7b and 7c and copy the data frozen to the volume 7c into the backup storage device 3, during which the pair of the volumes 7a and 7b are kept. This makes it possible to obtain the backup as reflecting on the volume 7b the updated content to the volume 7a and keeping the duplex state.

In the foregoing embodiment, the disk system operates to perform the backup process along the command being sent from the host computer. Alternatively, in the first embodiment, the host computer serves to issue the CCOPY command to the switch 4 so that the switch 4 may perform the copy process of the data. In this case, the host computer operates to specify as command parameters a port address of a port to be connected to the disk system serving as a copy source, addresses of a volume to be backed up (secondary volume) and a target block, and an address of the backup storage device. The switch 4 operates to interpret the command, read the data out of the block of the secondary volume, and copy the data onto the backup storage device 3. In this case, like the foregoing embodiment, while the data is being copied through the switch, updating of the data to the user volume is made possible. Further, the split of the pair volume and the re-synchronization may be instructed by the switch 4. This makes it possible to implement the backup merely by serving the host computer to issue a command to the switch once.

As another embodiment, the backup storage device may operate to perform the copy process with the CCOPY command. In this case, after the pair split is indicated to the disk system, the CCOPY command is issued to the backup storage device. For the parameters of the CCOPY command at this time, there are specified a port address of a channel path connected to the disk system serving as a copying source and addresses of the volume and the target block. The backup storage device is merely required to interpret this command, read the data out of the specified block, and then store the data.

Figure 9:
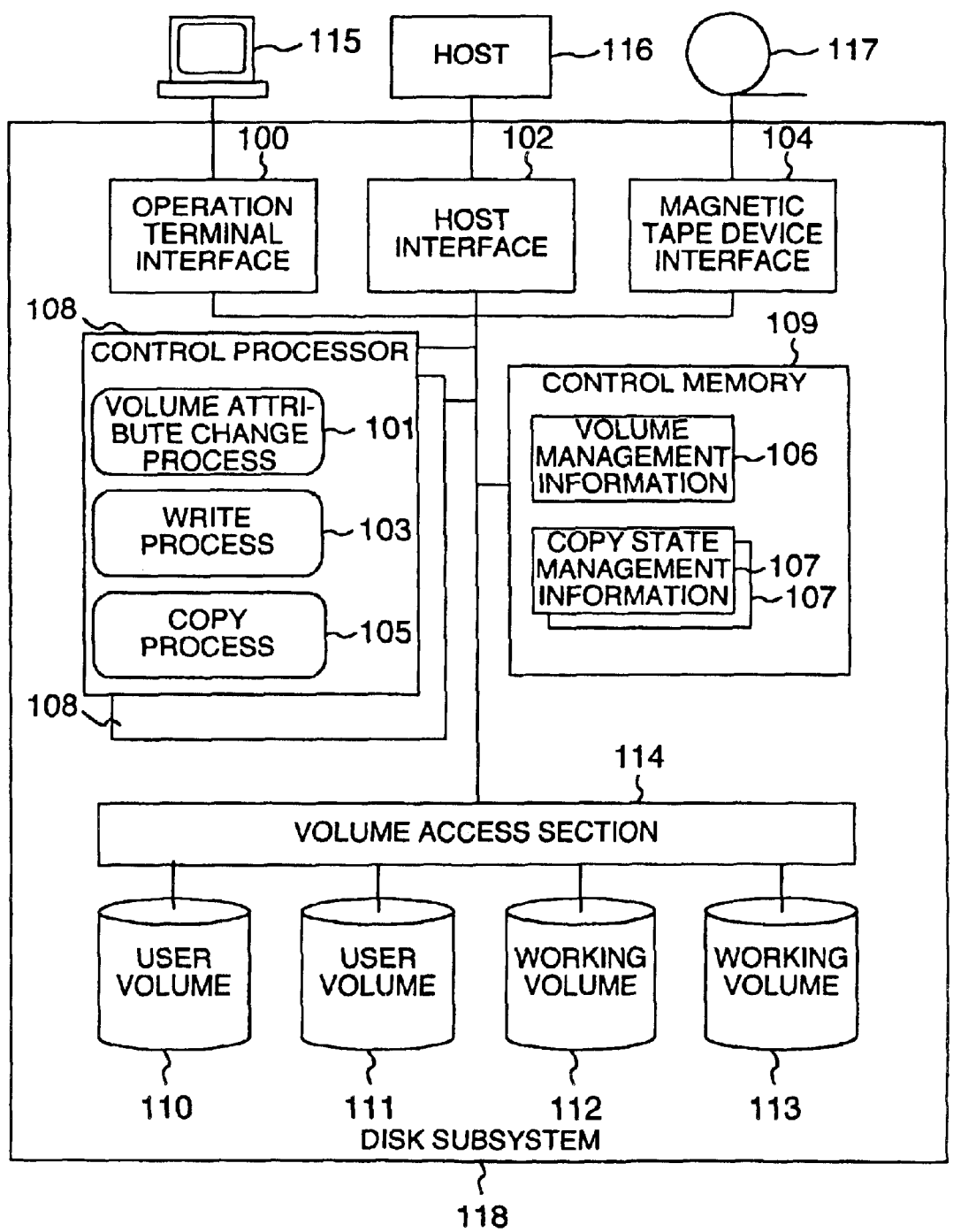
FIG. 9 is a simplified block diagram showing an arrangement of a computer system according to a fifth embodiment of the invention.

FIG. 9 is a block diagram showing an arrangement of a computer system according to the fifth embodiment.

The computer system of this embodiment includes a disk subsystem 118 for storing user data, a host computer 116 for issuing to the disk subsystem 118 a read request, a write request and a copy request for the user data stored therein, and a magnetic tape device 117 for storing the backup of the data stored in the disk subsystem 118.

The disk subsystem 118 includes a host interface 102 serving as an interface with the host computer 116, a magnetic tape device interface 104 serving as an interface with the magnetic tape device 117, a control processor 108 for controlling various processes in the disk subsystem 118, a control memory 109 for storing control information used by the control processor 108, and a volume access section 114 for accessing the volume serving as the storage unit for storing the data.

The control processor 108 includes a volume attribute change process 101, a write process 103, and a copy process as functions about the backup process in this embodiment. These functions are actually implemented by the program (module) executed by the control processor 108. Further, the control processor 108 includes various functions for controlling the disk subsystem. However, these functions are not directly related with the present invention. Hence, the description and the illustration thereabout are left out herein. In addition, of these functions, the volume attribute change process 101 is not used in the fifth embodiment. The process 101 will be described with respect to the sixth embodiment to be discussed below.

The control memory 109 holds volume management information 106 and copy state management information 107 as control information used for the backup process in this embodiment.

The disk subsystem 118 includes as a volume serving as a storage unit for storing data user volumes 110 and 111 and working volumes 112 and 113. The user volumes 110 and 111 are used for storing the user data. The working volumes 112 and 113 are used for storing the data to be saved during the backup process. Each volume has a volume number added as an identifier.

In this embodiment and the following sixth embodiment, the volume is formed of a logical disk device and it means a logical storage unit recognized as one storage unit by the host computer. One physical disk device may be used as one volume. Alternatively, two or more volumes may be formed on one disk device. If the disk subsystem 118 is composed of the so-called RAID, two or more volumes are formed on two or more physical disk devices composing the RAID.

The storage area of each volume is composed of plural blocks. Each block is numbered by a block number 0, 1, 2, N (N is 0 or an integer value and may be different in each volume) for identifying each block.

FIG. 10 is a conceptual illustration showing a data structure of the copy state management information 107.

The copy state management information 107 includes information about a copy operation. The copy state management information 107 is referred and updated in the write process 103 and the copy process 105 executed in response to the write request and the copy request issued by the host computer 116.

As shown in FIG. 10, the copy state management information 107 is arranged to have an in-use flag 300, a copy source volume number 303, and a block information 304. The in-use flag 300 is a flag that indicates whether or not the copy state management information 107 is in use and that has two values for indicating "non-use" and "in-use". The copy source volume number 303 stores a volume number of the volume for storing the data to be copied by the backup process. The block information 304 indicates the state of the block of the volume indicated by the copy source volume number 303.

The block information 304 includes a block number 301 and a copy state 302 as the information for indicating the block state. The copy state 302 has values for indicating "copy unnecessary", "copy necessary & unsaved", "copy necessary & saved", and "copied", respectively.

The "copy unnecessary" indicates a block for storing the data that is not needed to be copied. The "copy necessary & unsaved" indicates a block for storing the data that is needed to be copied. The "copy necessary & saved" indicates a block in which the data needed to be copied when the copy request is received has been already saved to the working volume.

FIG. 11 is a conceptual illustration showing a data structure of the volume management information 106.

The volume management information 106 indicates the state of the volume, in which each volume number 400 has a copy state flag 401. The copy state flag 401 has values that indicate "under copying" and "ordinary". The "under copying" means that the volume is to be copied. The "ordinary" means that the volume is not to be copied.

Figure 12:
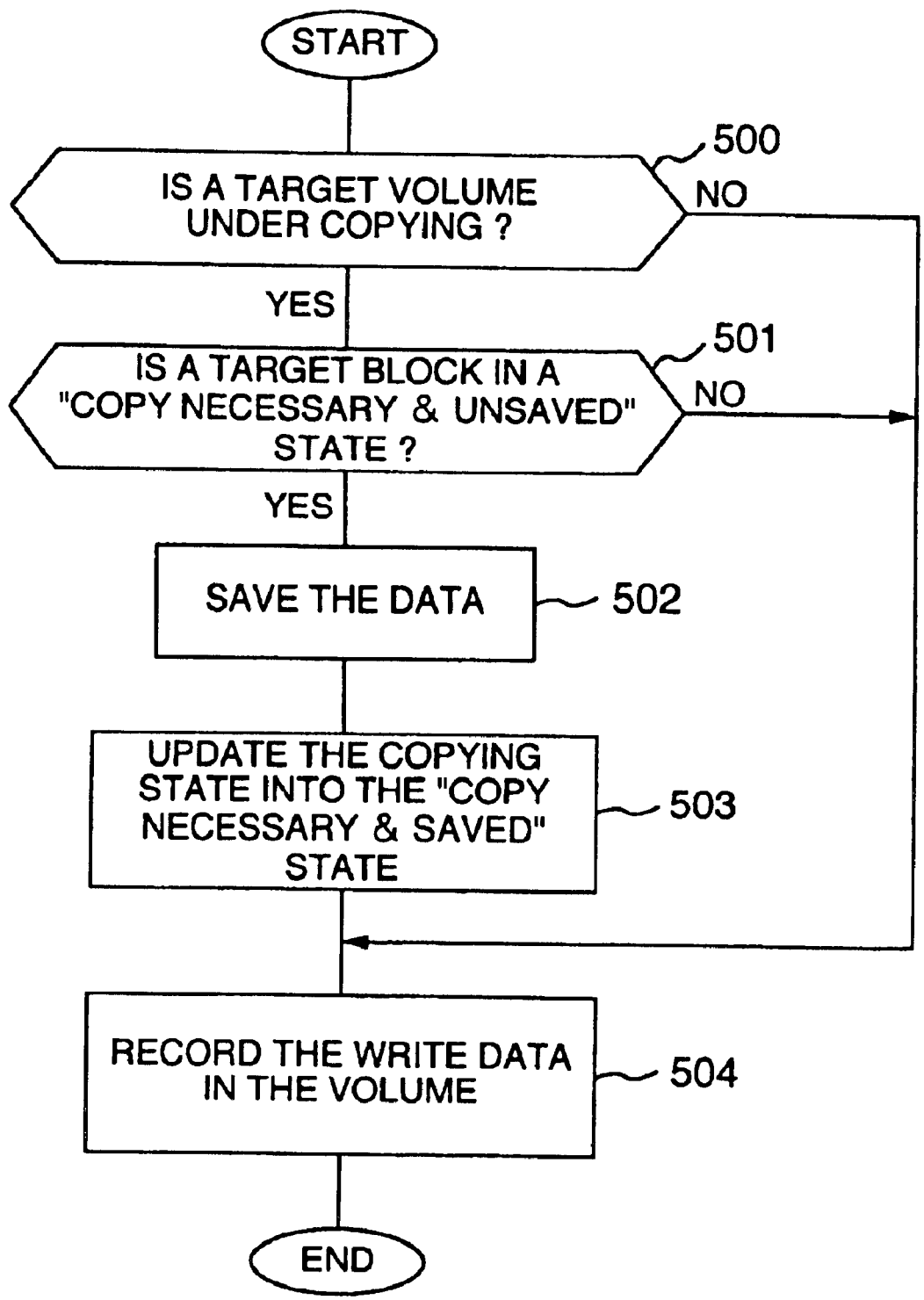
FIG. 12 is a flowchart showing a flow of the as writing process in the fifth embodiment.

FIG. 12 is a flowchart showing a flow of the write process to be executed in response to the write request given from the host computer in this embodiment.

In writing or updating the user data, the host computer 116 operates to issue the write request to the disk subsystem 118. The write request includes a volume number of the volume in which the write data is to be written, a block number of the block in which the write data is to be written, and the write data themselves.

In receipt of the write request, the control processor 108 starts the write process 103.

At first, the control processor 118 operates to refer to the volume management information 106 and determine if the copy process to be discussed below is under execution with respect to the data of the volume to be written. More specifically, the processor 118 operates to check the state of the copy state flag 401. If the flag 401 indicates "under copying", the process goes to a step 501, while if the flag 401 indicates "ordinary", the process goes to a step 504 (step 500).

At the step 501, the control processor 118 operates to check the state of the write request by referring to the copy state management information 107, for the purpose of determining if the data saving is needed. Specifically, the processor 118 operates to select the copy state management information 107 for storing the same value as the volume number of the to-be-written volume in the copy source volume number 303. Then, the processor 118 operates to check the copy state 302 for determining if the to-be-written block is in the "copy necessary & unsaved" state. If the copy state 302 has a value for indicating the "copy necessary & unsaved", the process goes to the step 502 at which the data is saved. If the copy state 302 has another value fit rather than the value for indicating the "copy necessary & unsaved", since the data is not needed to be saved, the process goes to the step 504.

At the step 502, the control processor 118 operates to read the data stored in the block indicated as the "copy necessary & unsaved" by the copy state 302 of the blocks to be written from the user volume 110 through the use of the volume access section 114. Then, the processor 118 operates to record the read data in the working volume 112. In this recording, the data is written in the block of the working volume 112 having the same block number as the block having stored the data read from the user volume 110.

At the step 503, the control processor 118 operates to update the copy state 302 of the block in which the data is saved at the step 502 into the value for indicating the "copy necessary & saved".

At the step 504, the write data received from the host computer 116 is recorded in the block specified by the user volume. Then, the process is terminated.

Figure 13:
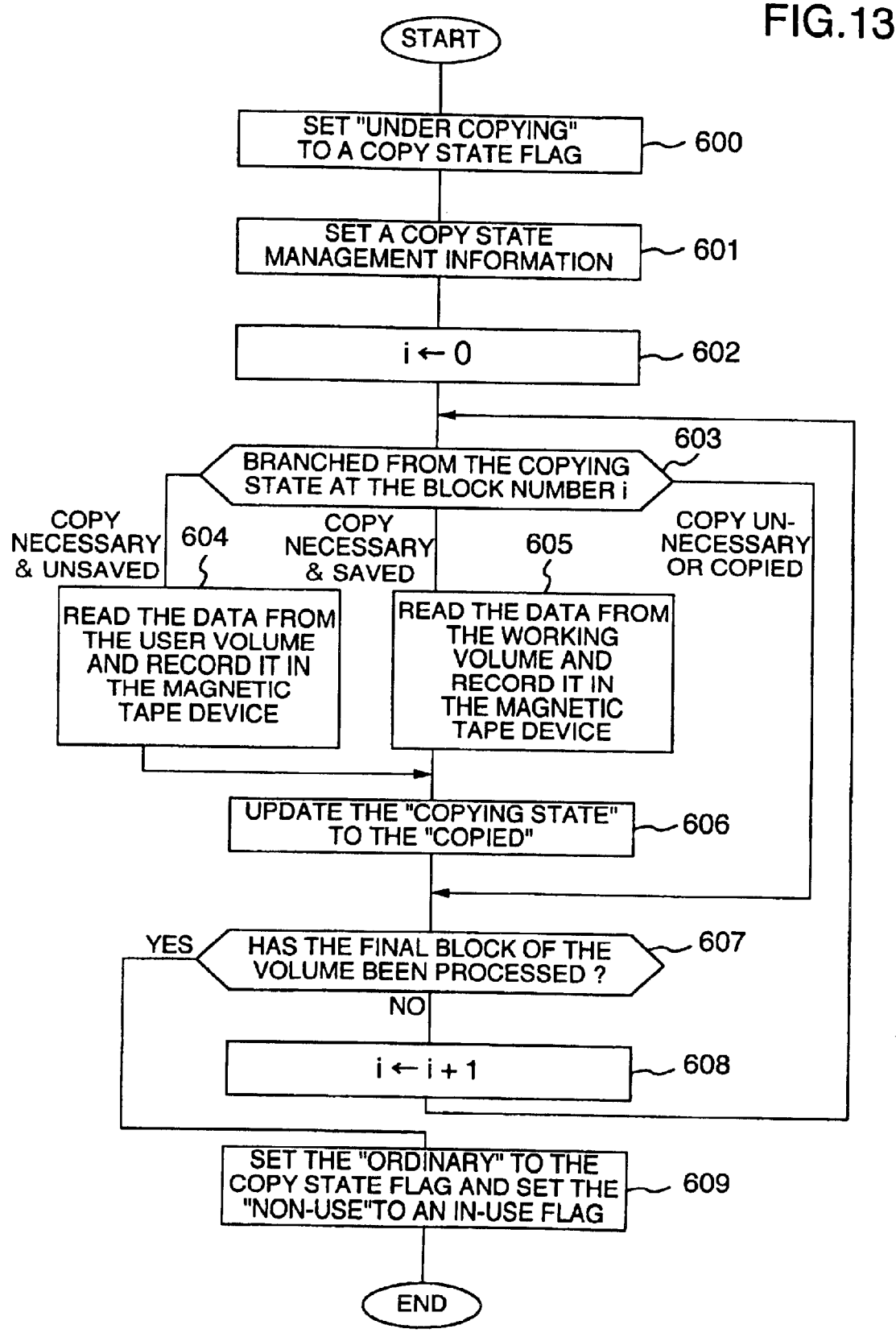
FIG. 13 is a flowchart showing a flow of the copy process in the fifth embodiment.

FIG. 13 is a flowchart showing a flow of the copy process 105 to be executed in response to the copy request given from the host computer.

The copy request issued by the host computer 116 includes a volume number of the volume having stored the data to be copied and a block number of the block having stored the data to be copied.

In receipt of the copy request from the host computer 116, the control processor 118 starts the copy process 105.

In the copy process 105, the control processor 118 operates to select an entry to which the same volume number as the volume number 400 received as a parameter of the copy request is set. Then, the copy state flag 401 of the entry is set as the "under copying" (step 600).

The control processor 118 operates to select the copy state management information 107 in which the in-use flag 300 is set as a value for indicating "non-use" and then set the in-use flag of the selected copy state management information 107 as a value for indicating the "in use". Then, the control processor 118 operates to set the volume number functioning as a parameter for the copy request to the copy source volume number 303. Then, the processor 118 operates to set the value for indicating the "copy necessary & unsaved" to the corresponding copy state 302 to the same block number 301 as the block number specified by the parameter for the copy request and then set the value for indicating the "copy unnecessary" to the corresponding copy state 302 to another block number 301 (step 601).

Afterwards, by setting a variable i for specifying the block to zero, the variable i is initialized (step 602).

The control processor 118 operates to determine the process to be executed for the next time on the basis of the value of the corresponding copy state 302 to the same block number 301 as the value of the variable i in the copy state management information 107 selected at the step 601. That is, if the copy state 302 indicates the "copy necessary & unsaved", the process goes to a step 604, while if the copy state 302 indicates the "copy necessary & saved", the process goes to the step 605. If the copy state 302 indicates the "copy unnecessary" or "copied", the process goes to a step 607 (step 603).

At the step 604, the control processor 118 operates to read the data from the block of the user volume having the same block number as the variable i through the use of the volume access section 114. The control processor 118 operates to transfer the data read from the user volume 110 to the magnetic tape device 117 through the magnetic tape device interface 104 and then to record the data on the magnetic tape.

At the step 605, the control processor 118 operates to read out the data from the block of the working volume 112 having the block number matched to the variable i through the use of the volume access section 114. The processor 118 operates to transfer this data to the magnetic tape device 117 through the magnetic device interface 104 and then record the data on the magnetic tape.

After the transfer of the data from the user volume 110 or the working volume 112 to the magnetic tape device 117, the control processor 118 operates to set the value for indicating the "copied" to the corresponding copy state 302 to the same block number 301 as the variable i of the copy state management information 107 for indicating that the data of the block has been copied (step 606).

At the step 607, the control processor 118 operates to determine if the process has been executed about all the blocks of the user volume 110. If the process is terminated about all the blocks, the process goes to a step 609. If one or more blocks are still left, the processor 118 operates to increment the variable i by one at the step 608 and then goes back to the step 603 from which the similar process is executed about the remaining blocks.

At the step 609, the control processor 118 operates to set the value for indicating the "non-use" to the in-use flag 300 of the copy state management information 107 selected at the step 601. Lastly, the control processor then operates to set the value for indicating the "ordinary" to the copy state flag 401 of the volume management information 106 and then terminates the copy process 105.

In the aforementioned embodiment, the copy process is executed in response to the copy request issued from the host computer 116. As another idea, the disk subsystem 118 may provide an operation terminal interface 100 serving as an interface with the operation terminal 115 so that the operation terminal 115 may issue the copy request. In this case, the control processor 118 is inputted with the copy request from the operation terminal 115 through the operation terminal interface 100 and then starts the copy process 105.

As set forth above, by utilizing the volume as the area where the data is to be saved, it is possible to reduce the cost in comparison to the use of a semiconductor memory like a buffer as a storage medium. Further, since the data is backed up along the sequence specified by the copy request, the backup data may be stored in the sequential access type storage medium such as a magnetic tape without use of location information of the data. This thus makes it possible to reduce the overhead, the transfer data amount, and the storage data amount in the backup process.

In turn, the description will be oriented to the sixth embodiment of the invention. The computer system according to the following sixth embodiment basically has the same arrangement as the computer system according to the fifth embodiment. In this embodiment, the description will be oriented to the volume attribute change process 101 that is not used in the fifth embodiment. The use of the volume attribute change process 101 makes the content of the control information and the process to be executed slightly different from those of the fifth embodiment.

Figure 14:
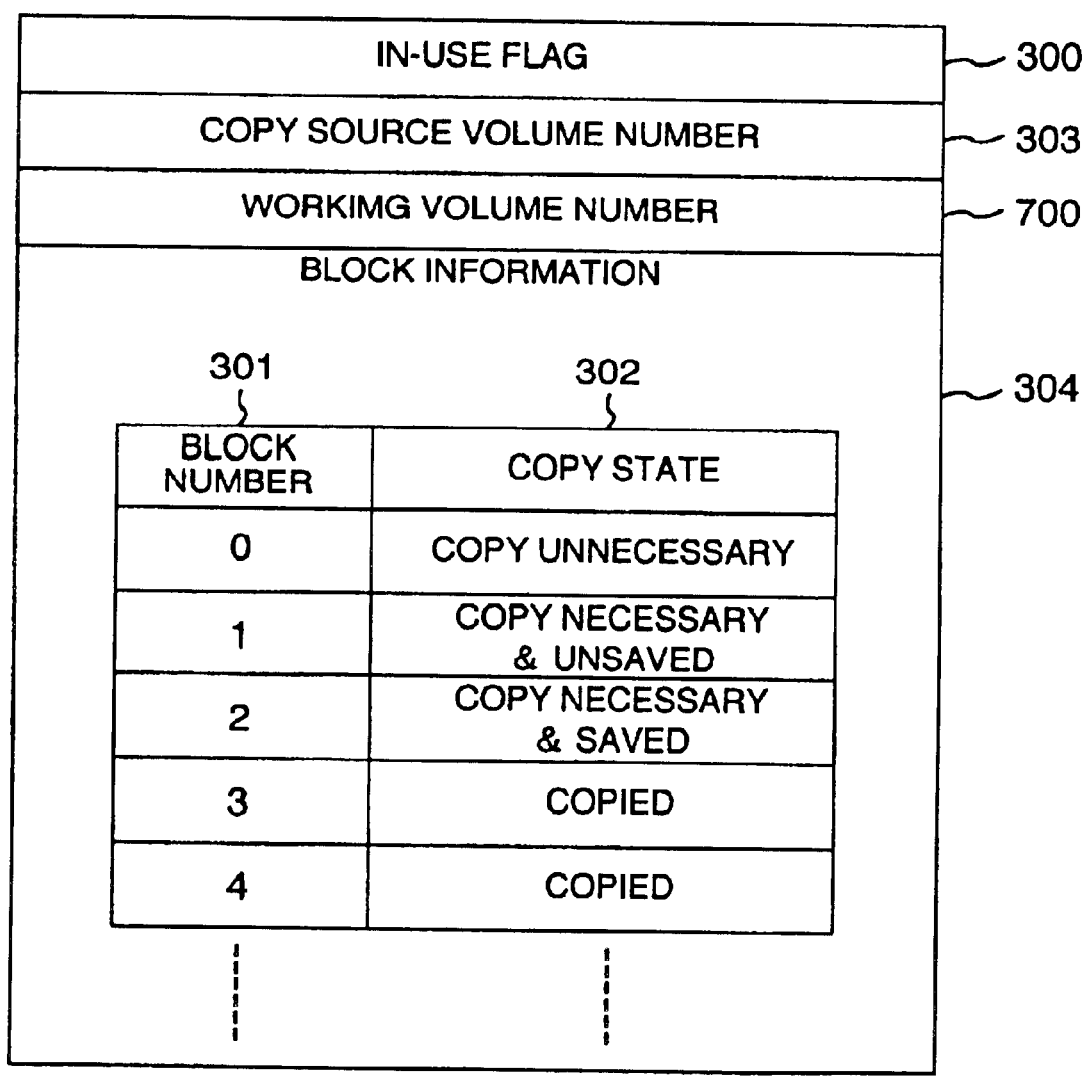
FIG. 14 is a conceptual illustration showing a data structure of copying state management information in a sixth embodiment of the invention.

FIG. 14 is a conceptual illustration showing a data structure of the copy state management information used in this embodiment. As shown in FIG. 14, the copy state management information in this embodiment further includes a working volume number 700 in addition to the in-use flag 300, the copy source volume number 303, and the block information 304.

The working volume number 700 is a volume number of the volume used as a working volume for saving the data during the execution of the copy request given from the host computer 116 or the operation terminal 115. In this embodiment, the volume having the volume number held in the working volume number 700 is used as the working volume.

Figures 15, 16:
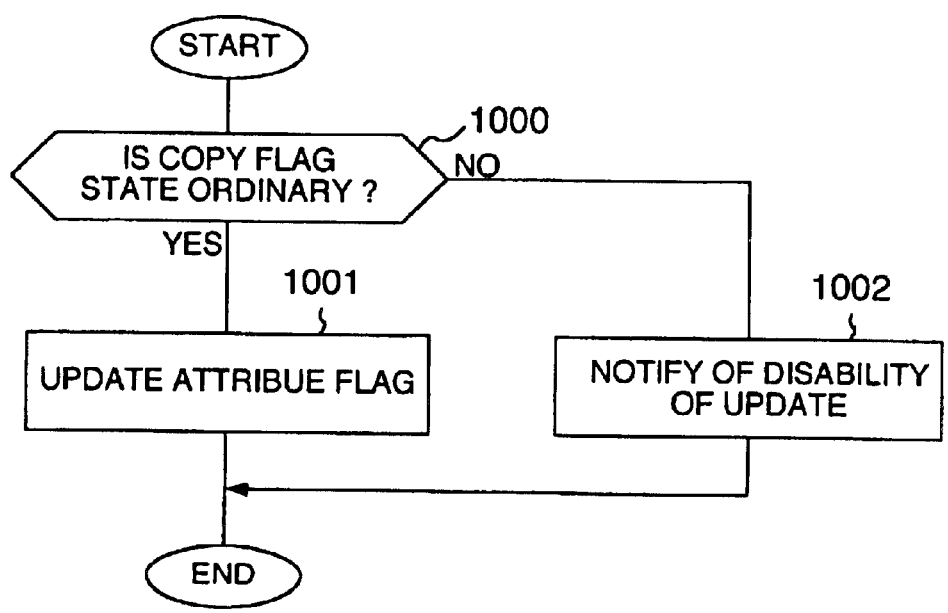
FIG. 15 is a conceptual illustration showing a data structure of volume management information in the sixth embodiment.
FIG. 16 is a flowchart showing a flow of a process for changing a volume attribute.

FIG. 15 is a conceptual illustration showing a data structure of the volume management information 106 included in this embodiment. As shown in FIG. 15, the volume management information 106 additionally includes an attribute flag 800 in the volume management information used in the fifth embodiment.

The attribute flag 800 is set as a value for indicating either one of the "user" and the "work" as a flag for indicating the attribute of the volume specified by the volume number 400. If the value set to the attribute flag 800 indicates the "user", the volume is used as the user volume for storing the user data. On the other hand, if the attribute flag 800 indicates the "work", the volume is used as the working volume for storing the saving data.

The host computer 116 or the operation terminal 115 enables to change the attribute of the volume (that means the "user volume" or the "working volume") by issuing the volume attribute change command to the disk subsystem 118. The volume attribute change command includes a "volume number" and an "attribute" as its parameters. The parameter "volume number" is a volume number for indicating the volume whose attribute is to be changed. The parameter "attribute" is a new attribute of the volume specified by the volume number.

FIG. 16 is a flowchart showing the volume attribute change process 101 to be executed by the control processor 108 in response to the volume attribute change command.

In the volume attribute change process 101, the control processor 108 operates to check the copy state flag 401 of the corresponding volume to the parameter "volume number" of the received volume attribute change command by referring to the volume management information 106 (step 1000).

If the copy state flag 401 is "under copying", the control processor 108 operates to report the disability of changing the attribute to the host computer 116 or the operation terminal 115 having issued the request (step 1002).

At the step 1000, if the copy state flag 401 is the "ordinary", the control processor 108 operates to change the attribute flag 800 into the attribute specified by the parameter and then terminates the process (step 1001).

Figure 17:
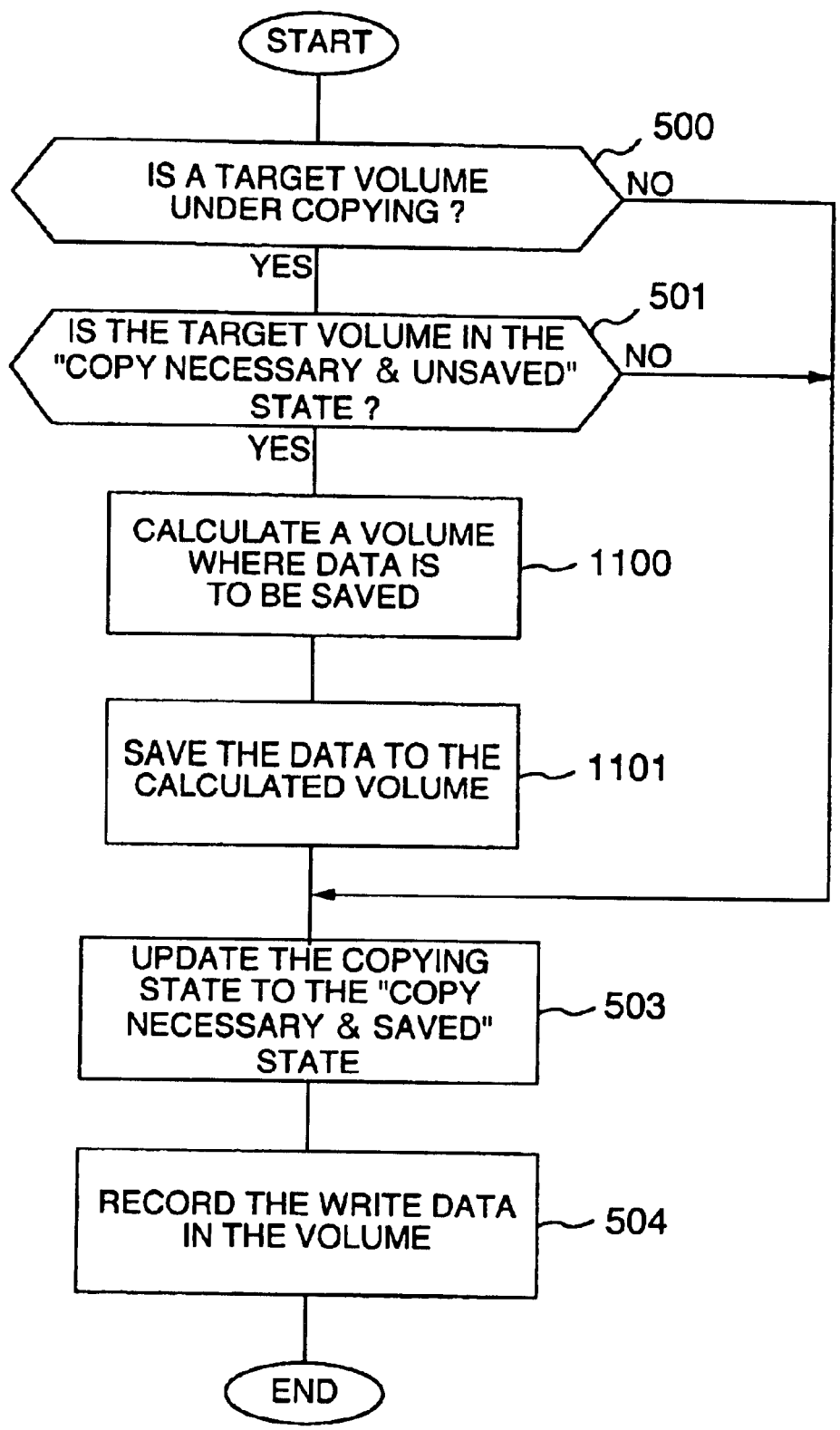
FIG. 17 is a flowchart showing a flow of the writing process in the sixth embodiment.

FIG. 17 is a flowchart showing the write process in this embodiment. In the write process of this embodiment, as shown in FIG. 17, the process at the step 502 in the write process of the fifth embodiment is replaced with the processes at the steps 1100 and 1101.

If the data is needed to be saved (the copy request is executed about the volume to be requested to be written and the copy state 302 of the target block to be requested to be written is the "copy necessary & unsaved"), at the step 1100, the control processor operates to obtain the copy state management information 107 in which the in-use flag 300 is set to "in-use" and the volume number of the volume to be requested to be written is set to the copy source volume number 303. Further, the control processor operates to identify the volume used as the working volume for saving the data on the basis of the volume number set to the working volume number 700 of the obtained copy state management information 107.

At the step 1101, like the step 502 of the fifth embodiment, the data is read out of the copy source volume and then is written in the working volume identified at the step 1100.

The processes at the same steps numbers as those of FIG. 12 except the steps 1100 and 1101 are the same as the processes at the step numbers described with respect to the fifth embodiment. Hence, the description about those processes will be left out here.

Figure 18:
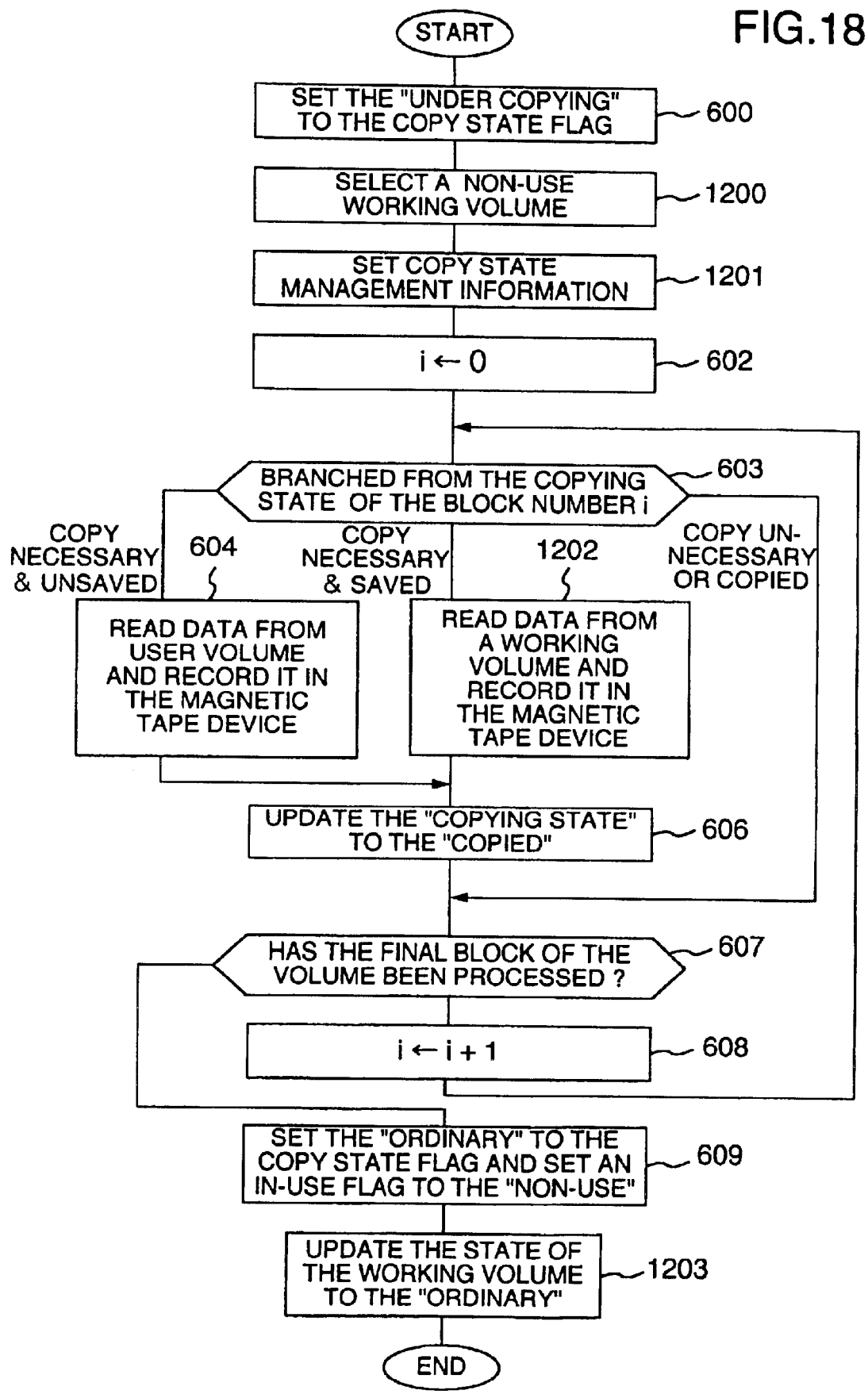
FIG. 18 is a flowchart showing a flow of the copy process in the sixth embodiment.

FIG. 18 is a flowchart showing a copy process in this embodiment.

The copy process of this embodiment is different from that of the fifth embodiment in the following respects. In this embodiment, the processes at the steps 1200 and 1201 are executed in place of the process at the step 601 of the fifth embodiment. In place of the process at the step 605 of the fifth embodiment, the process at the step 1202 is executed. Then, at the end of the process, the process at the step 1203 is added.

At the step 1200, the control processor 108 operates to select the volume whose attribute flag 800 is the "work", that is, the non-used working volume by referring to the volume management information 106. Then, the control processor 108 operates to set a value for indicating the "under copying" to the corresponding copy state flag 401 to the selected volume.

At the step 1201, like the process at the step 601 of the fifth embodiment, the control processor 108 operates to select the copy state management information 107 to be used and to perform the setting of each information. In this embodiment, the volume number of the volume selected at the step 1200 is set to the working volume number 700 of the copy state management information 107.

At the step 1202, the control processor 108 operates to read the data recorded on the block having the same block number as the variable i from the volume selected at the step 1200. Then, the control processor 108 operates to transfer the data read through the magnetic tape device interface 104 to the magnetic tape device 117 and then to record the data on the magnetic tape.

At the step 1203, the control processor 108 operates to set to the "ordinary" the corresponding copy state flag 401 to the volume selected at the step 1200 of the volume management information 106 and then release the in-use state.

The processes except the processes described herein are the same as those of the copy process of the fifth embodiment. Hence, the description thereabout is left out herein.

This embodiment supports the command for changing the attribute of the volume so that the user volume for saving the user data and the working volume for storing the saving data are replaced in use. This makes it possible to change the number of the working volumes according to a multiplicity of the required copy request and effectively utilize the working volume resources.

Further, when the copy request is received, the disk subsystem operates to select the working volume to be used for executing the copy request from the non-use working volumes and then to use it. When the copy process is terminated, the in-use working volume is returned to the non-use state. The repeating use of one working volume leads to the effective use of the working volume.

Further, the program for issuing the copy request, loaded on the host computer or the operation terminal, does not need to manage the working volume. Hence, the program is made simpler accordingly.

In the aforementioned fifth and sixth embodiments, the saving data is stored in the blocks having the same block numbers as those of the user volume inside of the working volume. Alternatively, the saving data may be sequentially stored in the blocks of the working volume from the head one. In this case, the copy state management information 107 may have the information as to whether or not the data is saved as well as the information as to the blocks where the data is saved. The copy process is executed to check the blocks having stored the saving data on the basis of this information, read the data out of those blocks, and then transfer the data to the magnetic tape device. This process just needs to secure the area for storing the saving data by the blocks indicated by the copy request given from the host computer or the operation terminal. This makes it possible to execute the copy request with a smaller volume of the working volume on a multiple basis.

Further, if the disk subsystem is inputted with the access request from the host computer to the volume, the process is executed to check if this volume is a user volume by referring to the volume management information. If this volume is the user volume, the access request is executed. If this volume is the working volume, the process is executed to report to the host computer that it is the volume having no capability of receiving the access request. The provision of such a checking mechanism allows the disk subsystem to inhibit the access to an incorrect volume.

What is claimed is:

1. A storage system arranged to be coupled with a backup device and a computer, comprising:

a first storage unit;

a second storage unit; and a storage control device for controlling access to said first storage unit and said second storage unit, wherein, in response to receipt thereby of a write request to a storage area in said first storage unit, in which data to be transferred from said storage system to said backup device is stored, after receiving a copy request from said computer to copy data stored in said storage system to said backup device, if said storage control device has not yet copied said data stored in said storage area in said first storage unit to said second storage unit, said storage control device waits to carry out said write request until after copying data stored in said storage area in said first storage unit to said second storage unit, but if said storage control device has already copied said data stored in said storage area in said first storage unit to said second storage unit, said storage control device carries out said write request, and said storage control device copies said data stored in said second storage unit to said backup device in response to said copy request if said storage control device has already copied said data stored in said first storage unit to said second storage unit, and, said storage control device copies said data stored in said first storage unit to said backup device in response to said copy request if said storage control device has not yet copied said data stored in said first storage unit to said second storage unit.

2. A storage system as claimed in claim 1, wherein said storage system includes two or more second storage units, and when said storage control device receives said copy request from said computer, said storage control device selects one of said two or more second storage units and stores said copied data from the first storage unit to the selected second storage unit.

3. A storage system as claimed in claim 1, wherein said storage control device copies data stored in a first storage area in said first storage unit to a second storage area in said second storage unit, said second storage area corresponding to said first storage area.

* * * * *